(12) United States Patent
Rangarajan et al.

(10) Patent No.: US 8,144,859 B1
(45) Date of Patent: Mar. 27, 2012

(54) INTEGRATED ENUM AND NUMBER PORTABILITY TRANSLATION IN A COMMUNICATION SYSTEM

(75) Inventors: Ramaswami Rangarajan, Belmont, CA (US); Warren B. Cope, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1352 days.

(21) Appl. No.: 11/748,343

(22) Filed: May 14, 2007

(51) Int. Cl.
*H04M 7/00* (2006.01)
(52) U.S. Cl. .............................. 379/221.14; 379/221.13
(58) Field of Classification Search ............. 379/221.14, 379/221.13; 370/352, 331
See application file for complete search history.

(56) References Cited

U.S. PATENT DOCUMENTS

| | | | |
|---|---|---|---|
| 7,027,582 B2* | 4/2006 | Khello et al. ............ 379/220.01 |
| 7,787,445 B2* | 8/2010 | Marsico ........................ 370/352 |
| 2003/0032432 A1* | 2/2003 | Red et al. ...................... 455/445 |
| 2005/0053213 A1* | 3/2005 | Giannoit .................. 379/201.12 |
| 2006/0245573 A1* | 11/2006 | Sheth et al. .............. 379/221.13 |
| 2006/0248586 A1* | 11/2006 | Delaney et al. .................. 726/22 |
| 2006/0262917 A1* | 11/2006 | Marsico .................... 379/220.01 |
| 2007/0121590 A1* | 5/2007 | Turner et al. .................. 370/352 |
| 2007/0121608 A1* | 5/2007 | Gu et al. ....................... 370/356 |
| 2007/0121908 A1* | 5/2007 | Benedyk et al. .............. 379/350 |
| 2007/0286379 A1* | 12/2007 | Wiatrowski et al. ..... 379/201.01 |
| 2008/0019356 A1* | 1/2008 | Marsico ........................ 370/352 |
| 2008/0031196 A1* | 2/2008 | Marathe et al. ............... 370/331 |
| 2008/0137832 A1* | 6/2008 | Heinze et al. ............ 379/220.01 |
| 2010/0091975 A1* | 4/2010 | Sheth et al. .............. 379/220.01 |

* cited by examiner

*Primary Examiner* — William Deane, Jr.

(57) ABSTRACT

An IP system receives a call placed to an ENUM address. The IP system transfers a signaling message indicating the ENUM address to a processing system. For a call to a ported number, the processing system translates the ENUM address into the LRN for a communication node that serves the called party and returns the LRN to the IP system. The IP system routes the call based on the LRN.

20 Claims, 6 Drawing Sheets

INTEGRATED ENUM AND NUMBER PORTABILITY TRANSLATION IN A COMMUNICATION SYSTEM

BACKGROUND OF THE INVENTION

1. Field of the Invention

The invention is related to the field of communications, and in particular, to a processing system that provides integrated ENUM and number portability translations in response to a single signaling message.

2. Description of the Prior Art

A caller places a call to a called party by signaling the E.164 number of the called party to a telecommunication network. The telecommunication network processes the E.164 number to establish a communication path between the caller and the called party. The caller and called party then exchange user communications over the communication path.

If the called party moves to a new location or changes telecommunication networks, the E.164 number may be ported to the new location or network. To port the E.164 number, a Location Routing Number (LRN) for the new location or network is loaded into a Number Portability (NP) database in association with the E.164 number of the called party. The LRN is assigned to a communication node at the new location or network that serves the called party.

After the move, the caller places another call to the called party by signaling the E.164 number of the called party to the telecommunication network. The telecommunication network queries the NP data base with the E.164 number to retrieve the LRN. The telecommunication number then establishes a communication path from the caller to the called party through the communication node based on the LRN. The caller and called party then exchange user communications over the communication path that now passes through the communication node.

More recently, Internet Protocol (IP) networks have implemented Electronic Number Mapping (ENUM) to associate called numbers with call termination instructions specified by the called party. When a caller places a call by specifying the E.164 number of the called party, the ENUM-enabled caller device translates the E.164 number into a Uniform Resource Indicator (URI). The caller device then transfers the URI to the IP network.

The IP network transfers a signaling message indicating the URI to an ENUM database. The ENUM database processes the URI to retrieve a Naming Authority Pointer Resource Record (NAPTR) for the called party. The NAPTR has call termination instructions specified by the called party. These instructions typically comprise a prioritized list of telephone numbers and IP addresses. The ENUM database transfers a signaling message to the IP network indicating the NAPTR. The IP network processes the NAPTR from the signaling message to route the call.

In some ENUM call scenarios, the NAPTR yields an E.164 number. The IP network then routes the call to a telecommunication network based on the E.164 number. The telecommunication network must then transfer another signaling message to an NP database to determine if the E.164 number has been ported. If so, then the NP database transfers a signaling message to the telecommunication network indicating the LRN for the ported number. The telecommunication network then routes the call to the new location or network based on the LRN.

Unfortunately, the current calling scenario requires two separate signaling messages to translate the URI into the LRN—one message to translate the URI into the E.164 number and another message to translate the E.164 number into the LRN. These two messages may delay call set-up to the annoyance of the caller. In addition, the IP network routes the call based on the E.164 before the NP query occurs, so the IP network does not get to route the call based on the LRN. Thus, the call may be routed through an unnecessary network just to obtain the LRN before routing the call to the ported destination.

SUMMARY OF THE INVENTION

An IP system receives a call placed to an ENUM address, such as a URI. The IP system transfers a signaling message indicating the ENUM address to a processing system. For a call to a ported number, the processing system translates the URI into the LRN for the ported number and returns the LRN to the IP system. The IP system then routes the call based on the LRN. Advantageously, the number of signaling messages required to obtain the LRN is reduced. In addition, the IP system also has the ability to route the call based on the LRN. Thus, the IP system may route the call to the ported location without using an intermediate telecommunication network.

DETAILED DESCRIPTION OF THE PREFERRED EMBODIMENT

Figure 1:
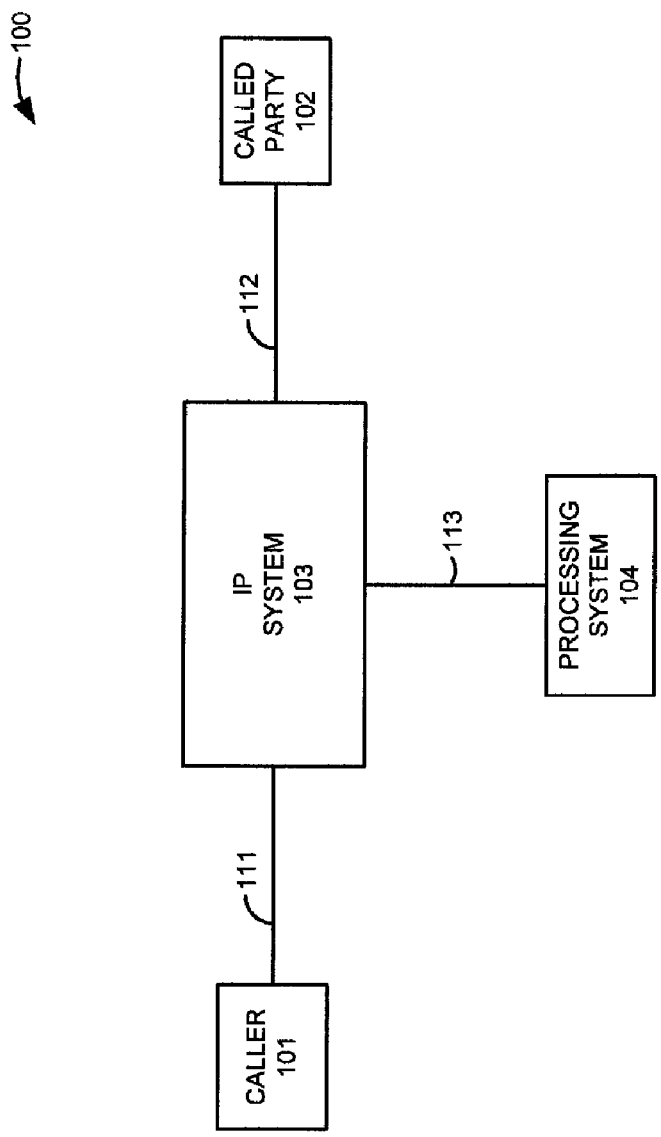
FIG. 1 illustrates a communication system in an embodiment of the invention.

FIG. 1 illustrates communication system 100 in an embodiment of the invention. Communication system 100 transfers user communications for a call from caller 101 to called party 102. Communication system 100 comprises IP system 103 and processing system 104. IP system 103 is coupled to caller 101 by link 111. IP system 103 is coupled to called party 102 by link 112. Links 111-112 may comprise direct links or they may comprise various connections and network elements that are omitted for clarity. For example, link 111 may include an Internet Service Provider (ISP), and link 112 may include a local telephone network.

IP system 103 comprises call processors, IP routers, and IP links. IP system 103 receives and transfers call signaling. IP system 103 processes the call signaling to determine call routing. IP system 103 transfers user communications for calls from link 111 to link 112 based on the call routing.

Processing system 104 comprises a communication interface, computer system, and database. Processing system 104 receives and transfers call signaling. Processing system 104 processes the call signaling to translate ENUM addresses into E.164 numbers and to translate the E.164 numbers into LRNs. IP system 103 and processing system 113 are configured to exchange call signaling over link 113. The call signaling uses Signaling System #7 (SS7), Session Initiation Protocol (SIP), Interim Standard 41 (IS-41), or some other form of telecommunications signaling.

Figure 2:
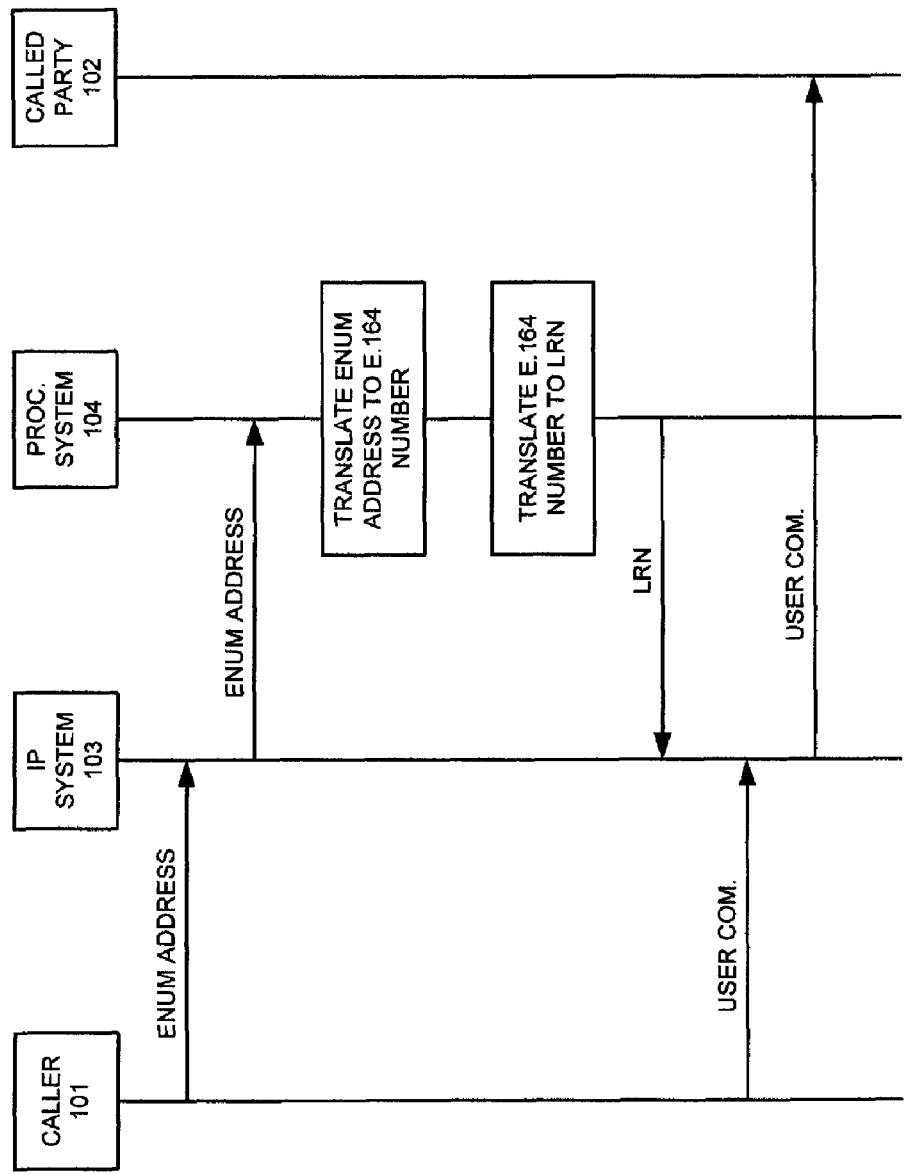
FIG. 2 illustrates the operation of the communication system in an embodiment of the invention.

FIG. 2 illustrates the operation of communication system 100 in an embodiment of the invention. Caller 101 transfers the ENUM address for called party 102 to IP system 103. In response, IP system 103 transfers the ENUM address to processing system 104. Processing system 104 translates the ENUM address for the called party into the corresponding E.164 number for the called party. Processing system 104 translates the E.164 number for the called party into the corresponding LRN. Processing system 104 transfers the LRN to IP system 103. Called party 102 previously ported their E.164 number to a communication node in link 112, and the LRN is assigned to that communication node.

IP system 103 receives user communications for the call from caller 101. IP system 103 transfers the user communications to link 112 based on the LRN. Link 112 transfers the user communications through the communication node associated with the LRN to called party 102.

Figure 3:
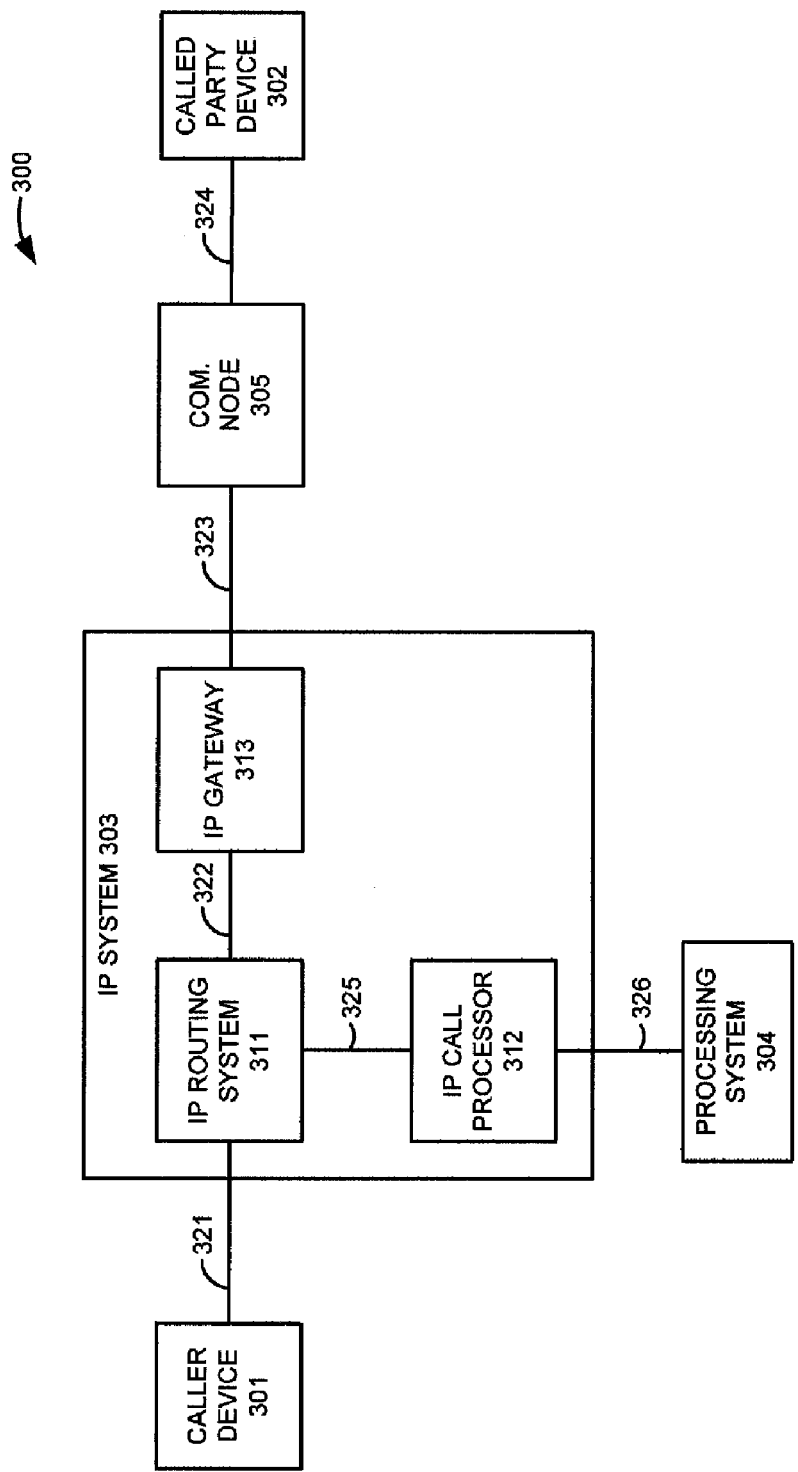
FIG. 3 illustrates a communication system in an embodiment of the invention.

FIG. 3 illustrates communication system 300 in an embodiment of the invention. Communication system 300 comprises caller device 301, called party device 302, IP system 303, processing system 304, and communication node 305. IP system 303 comprises IP routing system 311, IP call processor 312, and IP gateway 313. Caller device 301 and IP routing system 311 are coupled by link 321. IP routing system 311 and IP gateway 313 are coupled by link 322. IP gateway 313 and communication node 305 are coupled by link 323. Communication node 305 and called party device 302 are coupled by link 324. IP routing system 311 and IP call processor 312 are coupled by link 325. IP call processor 312 and processing system 304 are coupled by link 326.

Caller device 301 and called party device 302 comprise telephones, computers, digital assistants, Internet appliances, wireless transceivers, or some other user communication device. In some examples, caller device 301 is a personal computer configured for Internet ENUM communications, and called party device 302 is a wireless communication device, such a mobile telephone.

IP routing system 311 comprises IP routers and IP links. IP call processor 312 comprises a soft switch. IP gateway 313 comprises communication equipment that interworks user communications between the IP format and another communication format suitable for link 323. For example, IP gateway 313 may convert between the IP format and the Time Division Multiplex (TDM) format.

Processing system 304 comprises a communication interface, computer system, and database. The communication interface exchanges signaling over link 326. The computer system and database translate ENUM Uniform Resource Indicators (URIs) into LRNs that correspond to ported E.164 numbers.

Communication node 305 comprises a local telephone switch, Mobile Switching Center (MSC), Base Station Controller (BSC), or some other communication network element. Previously, the called party has ported their E.164 number to communication node 305. An LRN has been assigned to communication node 305 for routing calls through communication node 305 to the called party.

Link 323 may comprise a direct link between IP gateway 313 and communication node 305. Alternatively, link 323 may comprise various connections and network elements that are omitted for clarity. For example, link 323 may include a long distance telecommunications network. Link 324 comprises an analog line, wireless link, IP link, or some other communication media.

Figure 4:
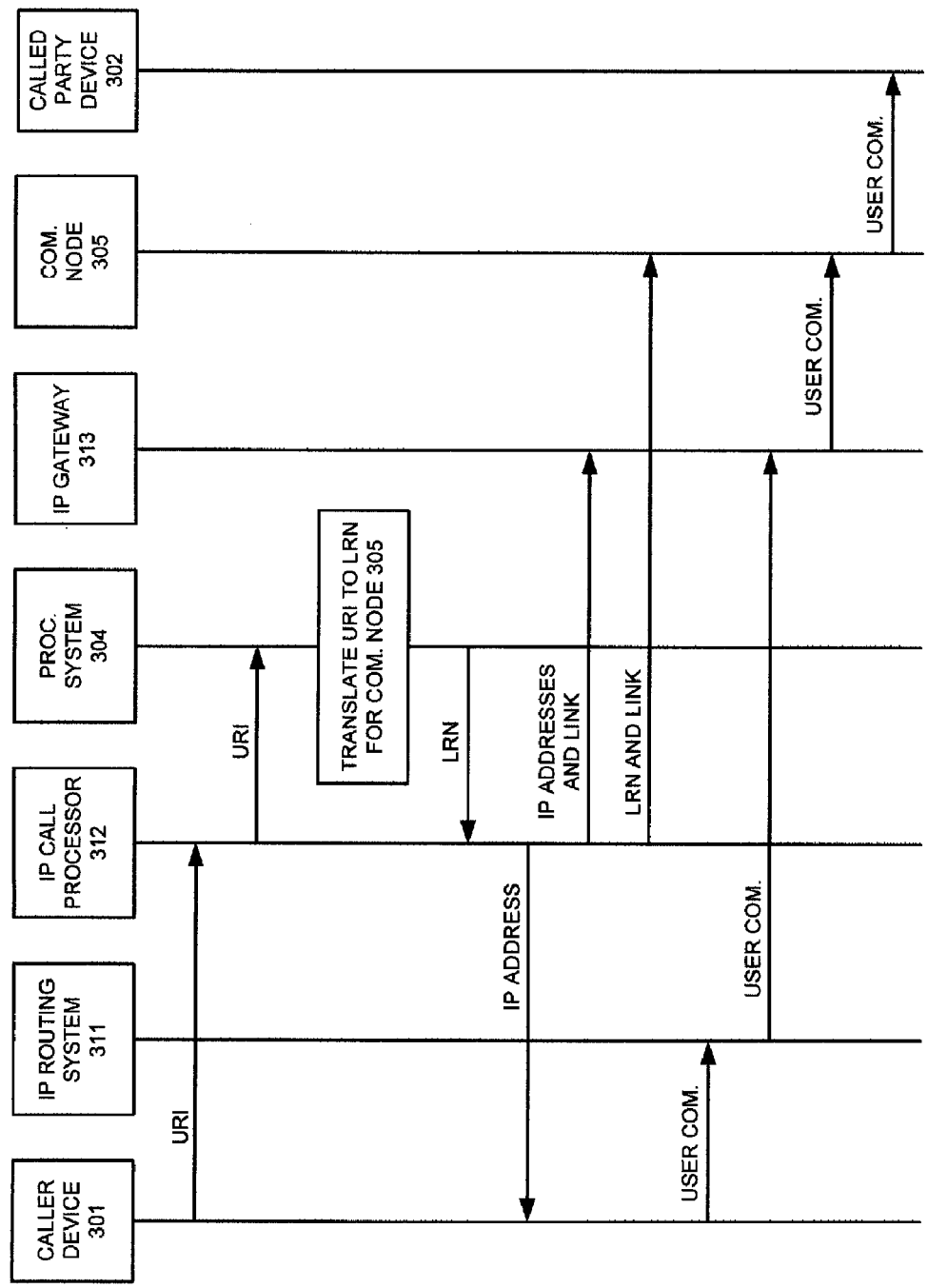
FIG. 4 illustrates the operation of the communication system in an embodiment of the invention.

FIG. 4 illustrates the operation of communication system 300 in an embodiment of the invention. The caller operates caller device 301 to transfer a SIP message indicating the ENUM URI for the called party to IP call processor 312. In response to the SIP message, IP call processor 312 transfers a SIP message indicating the URI for the called party to processing system 304.

Processing system 304 translates the URI into the LRN assigned to communication node 305 as follows. Processing system 304 processes the URI for the called party to retrieve an ENUM Naming Authority Pointer Resource Record (NAPTR) for the called party. Processing system 304 processes the NAPTR for the called party to identify the E.164 number for called party device 302. Processing system 304 enters an NP data structure with the E.164 number to yield the LRN assigned to communication node 305.

Processing system 304 transfers a SIP message to IP call processor 312 indicating the LRN assigned to communication node 305. IP call processor 312 processes the LRN to select an IP address for IP gateway 313 and link 323 to communication node 305. IP call processor 312 transfers a SIP message to caller device 301 indicating the IP address for IP gateway 313. IP call processor 312 transfers a SIP message to IP gateway 313 indicating the IP address for caller device 301, the IP address for IP gateway 313, and link 323. IP call processor 312 indicates the LRN and link 323 to communication node 305.

Caller device 301 transfers user communications for the call in IP packets having the IP address for IP gateway 313 to IP routing system 311. IP routing system 311 transfers the IP packets to IP gateway 313 based on the IP address. IP gateway 313 transfers the user communication to communication node 305 over link 323. In response to the LRN, communication node 305 transfers the user communications to called party device 302.

Figure 5:
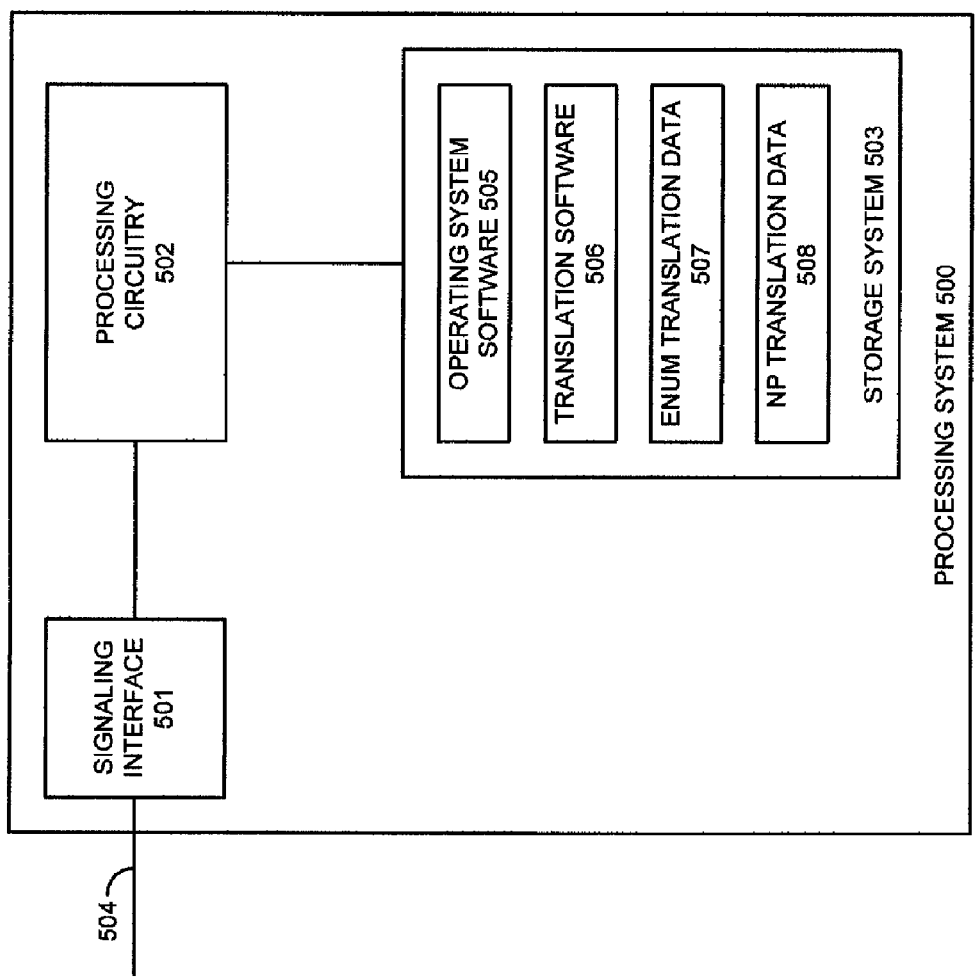
FIG. 5 illustrates a processing system in an embodiment of the invention.

FIG. 5 illustrates processing system 500 in an embodiment of the invention. Processing system 500 comprises signaling interface 501, processing circuitry 502, and storage system 503. Signaling interface 501 is connected to signaling link 504. Storage system 503 stores operating system software 505, translation software 506, ENUM translation data 507, and NP translation data 508.

Signaling interface 501 comprises communications circuitry and software configured to exchange signaling, such as SIP or SS7, over signaling link 504. Signaling interface 501 retrieves signaling information, such as URIs, from received signaling messages and transfers the signaling information to processing circuitry 502. Signaling interface 501 receives new signaling information, such as LRNs, from processing circuitry 502 and transfers the new signaling information in signaling messages over signaling link 504.

Processing circuitry 502 comprises computer microprocessors and supporting circuitry. Storage system 505 comprises memory circuitry, disk drives, or some other memory devices. Processing circuitry 502 retrieves and executes operating system software 505 to direct general system operation. Processing circuitry 502 retrieves and executes translation software 506 to translate received signaling information into new signaling information. Under the control of translation software 506, processing circuitry 502 retrieves and processes ENUM translation data 507 to translate ENUM addresses, such as URIs, into corresponding call termination instructions. In the above embodiments, the call termination instructions are E.164 numbers, but the called party could specify other terminations instructions, such as an email address or Internet telephony address.

In particular embodiments, processing circuitry 502 processes ENUM addresses to retrieve corresponding NAPTR data for the called parties, and then processing circuitry 502 processes the NAPTR data to identify call termination instructions for the called parties, such as associated E.164 numbers. Under the control of translation software 506, processing circuitry 502 retrieves and processes NP translation data 508 to translate the E.164 numbers into the LRNs that are assigned to the communication nodes where the E.164 numbers have been ported.

Figure 6:
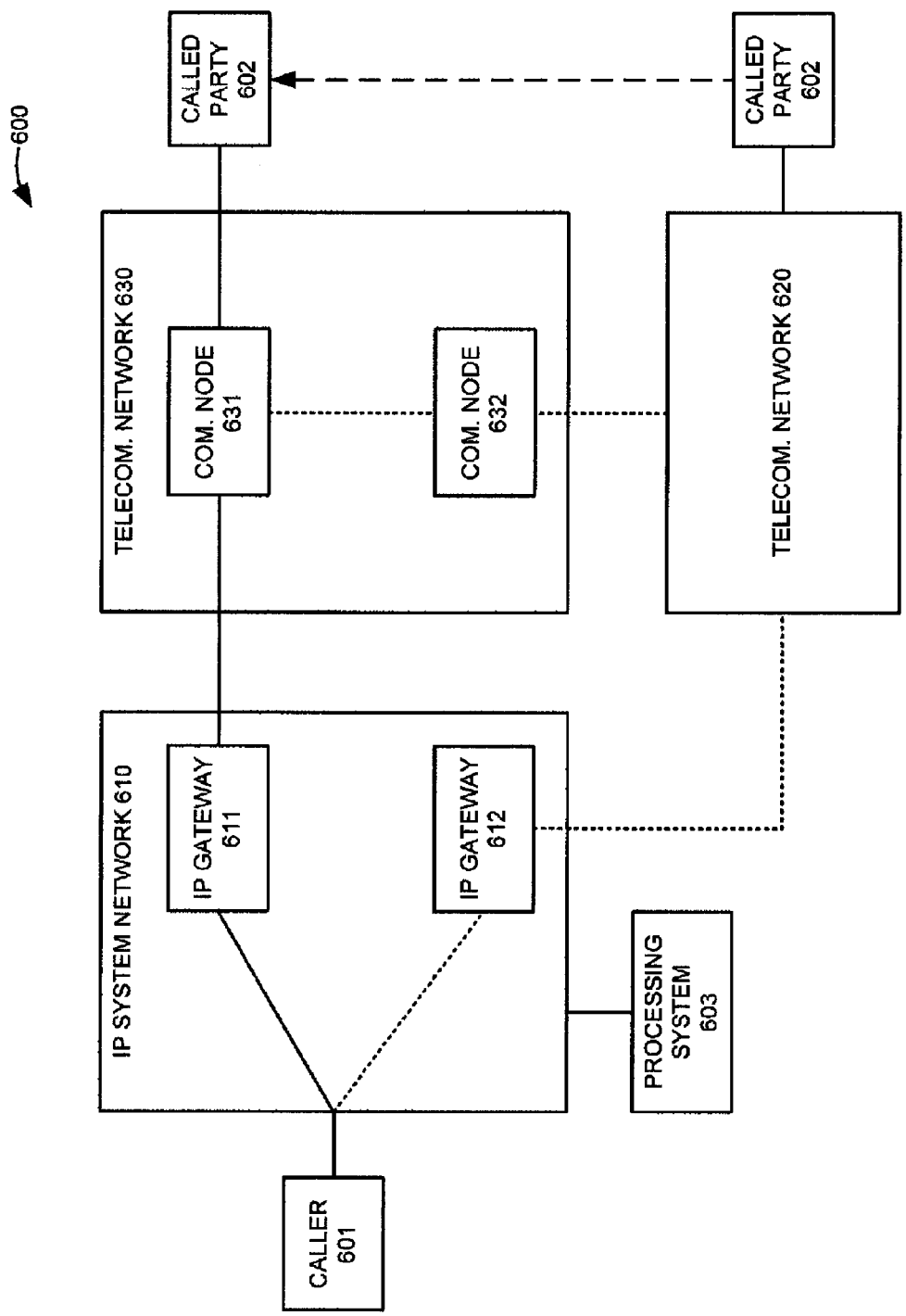
FIG. 6 illustrates a communication architecture in an embodiment of the invention.

FIG. 6 illustrates communication architecture 600 in an embodiment of the invention. Communication architecture 600 comprises caller 601, called party 602, processing system 603, IP network 610, telecommunication network 620, and telecommunication network 630. IP network 610 includes IP gateways 611-612. Telecommunication network 630 includes communication nodes 631-632. As indicated by the dashed arrow, called party 602 moves from telecommunication network 620 to telecommunication network 630. Correspondingly, called party 602 ports their E.164 number to communication node 631.

Caller 601 places a call by transferring the ENUM address for called party 602 to IP network 610. IP network 610 transfers the ENUM address to processing system 603. Processing system 603 translates the ENUM address into an LRN assigned to communication node 631 and transfers the LRN to IP network 610. IP network processes the LRN to select IP gateway 611. User communications for the call flow from caller 601 to called party 602 through IP gateway 611 and communication node 631.

In prior systems, processing system 603 would only return the E.164 number to IP network 610 in response to the ENUM address. Based on the E.164 number, IP network 610 would route the call through IP gateway 612 to telecommunication network 620 as indicated by the dotted lines. Telecommunication network 620 would exchange signaling with an NP database to translate the E.164 number to the LRN. In response to the LRN, telecommunication network 620 would route the call to communication node 632, and communication node 632 would route the call to communication node 631 as indicated by the dotted lines.

Note the advantage of using integrated ENUM and NP translations. The number of signaling messages required to obtain the LRN is reduced over prior systems. IP network 610 may now route the call directly to telecommunication network 630 and omit the wasted route through telecommunication network 620. IP network 610 may also select an IP gateway based on the LRN. Thus, IP network 610 processes the LRN assigned to communication node 631 to select IP gateway 611 which is directly coupled to communication node 631, instead of selecting IP gateway 612 which is only indirectly coupled to communication node 631.

If desired, IP gateway 611 and communication node 631 can be integrated together, so IP network 610 can route the call directly to the communication node that is associated with the LRN and that serves the called party 602. Advantageously, this optimizes the use of IP network 610 when routing ENUM-based calls to ported numbers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system wherein a caller places a call to a called party by indicating an Electronic Number Mapping (ENUM) address for the called party to an Internet Protocol (IP) system, the method comprising:
   receiving the ENUM address for the called party from the IP system into a processing system;
   in the processing system, translating the ENUM address into an E.164 number that has been ported;
   in the processing system, translating the E.164 number into a Location Routing Number (LRN) for the ported E.164 number; and
   transferring the LRN from the processing system to the IP system.

2. The method of claim 1 wherein the ENUM address comprises a uniform resource indicator.

3. The method of claim 1 wherein the LRN is assigned to a communication node that serves the called party.

4. The method of claim 1 further comprising receiving user communications for the call from the caller into the IP system and routing the user communications from the IP system to a communication node associated with the LRN.

5. The method of claim 1 further comprising:
   processing the LRN in the IP system to select an IP address of an IP gateway;
   receiving user communications for the call from the caller into the IP system and transferring the user communications to the IP gateway using the IP address; and
   transferring the user communications for the call from the IP gateway to a communication node that is associated with the LRN.

6. The method of claim 1 wherein translating the ENUM address into the E.164 number comprises processing the ENUM address to retrieve a Naming Authority Pointer Resource Record (NAPTR) and processing the NAPTR to identify the E.164 number.

7. The method of claim 1 wherein translating the E.164 number into the LRN comprises entering a Number Portability (NP) data structure with the E.164 number to yield the LRN.

8. The method of claim 1 wherein the LRN is assigned to a communication node, wherein the E.164 number is associated with the called party, and wherein the called party has ported their E.164 number to the communication node.

9. The method of claim 1 wherein the E.164 number is associated with a wireless communication device operated by the called party and the LRN is assigned to a Mobile Switching Center (MSC) that serves the wireless communication device.

10. The method of claim 1 wherein receiving the ENUM address for the called party from the IP system into the processing system comprises receiving a first Session Initiation Protocol (SIP) message from a call processor in the IP system and wherein transferring the LRN from the processing system to the IP system comprises transferring a second SIP message to the call processor in the IP system.

11. A communication system comprising:
   an Internet Protocol (IP) system configured to receive a call from a caller to a called party indicated by an Electronic Number Mapping (ENUM) address and to transfer the ENUM address; and
   a processing system configured to receive the ENUM address for the called party, translate the ENUM address into an E.164 number that has been ported, translate the E.164 number into a Location Routing Number (LRN) for the ported E.164 number, and transfer the LRN to the IP system.

12. The communication system of claim 11 wherein the ENUM address comprises a uniform resource indicator.

13. The communication system of claim 11 wherein the LRN is assigned to a communication node that serves the called party.

14. The communication system of claim 11 wherein the IP system is further configured to receive user communications for the call from the caller and route the user communications to a communication node associated with the LRN.

15. The communication system of claim 11 wherein the IP system is further configured to process the LRN to select an IP address of an IP gateway, receive user communications for the call from the caller, and transfer the user communications to the IP gateway using the IP address wherein the IP gateway transfers the user communications for the call to a communication node that is associated with the LRN.

16. The communication system of claim 11 wherein the processing system is configured to translate the ENUM address into the E.164 number by processing the ENUM address to retrieve a Naming Authority Pointer Resource Record (NAPTR) and processing the NAPTR to identify the E.164 number.

17. The communication system of claim 11 wherein the processing system is configured to translate the E.164 number into the LRN by entering a Number Portability (NP) data structure with the E.164 number to yield the LRN.

18. The communication system of claim 11 wherein the LRN is assigned to a communication node, wherein the E.164 number is associated with the called party, and wherein the called party has ported their E.164 number to the communication node.

19. The communication system of claim 11 wherein the E.164 number is associated with a wireless communication device operated by the called party and the LRN is assigned to a Mobile Switching Center (MSC) that serves the wireless communication device.

20. The communication system of claim 11 wherein the IP system includes a call processor that is configured to transfer the ENUM address for the called party to the processing system in first Session Initiation Protocol (SIP) message and wherein the processing system is configured is to transfer the LRN to the call processor in a second SIP message.

* * * * *